US006703580B2

(12) United States Patent
Brunet et al.

(10) Patent No.: US 6,703,580 B2
(45) Date of Patent: Mar. 9, 2004

(54) PLASMA TORCH INCORPORATING A REACTIVE IGNITION TUBE AND IGNITER SQUIB INTEGRATING SUCH A TORCH

(75) Inventors: Luc Brunet, Bourges (FR); Jean Mary Lombard, Bourges (FR); Jean Francois Pierrot, Saint Doulchard (FR); Jean Luc Taillandier, Fussy (FR)

(73) Assignee: Giat Industries (FR)

( * ) Notice: Subject to any disclaimer, the term of this patent is extended or adjusted under 35 U.S.C. 154(b) by 153 days.

(21) Appl. No.: 09/958,572

(22) PCT Filed: Mar. 30, 2001

(86) PCT No.: PCT/FR01/00961

§ 371 (c)(1),
(2), (4) Date: Nov. 1, 2001

(87) PCT Pub. No.: WO01/77604

PCT Pub. Date: Oct. 18, 2001

(65) Prior Publication Data

US 2002/0157559 A1 Oct. 31, 2002

(30) Foreign Application Priority Data

Apr. 11, 2000 (FR) ............................................ 00 04734

(51) Int. Cl.[7] ............................................... B23K 10/00

(52) U.S. Cl. ............................ 219/121.52; 219/121.48; 219/121.36; 102/202.7; 102/202.8

(58) Field of Search ....................... 219/121.52, 121.48, 219/121.51, 75; 102/202.9, 472, 202.7, 202.8, 202.5; 89/8

(56) References Cited

U.S. PATENT DOCUMENTS 5,431,101 A * 7/1995 Aarrell, Jr. et al. ...... 102/202.5
6,435,095 B1 * 8/2002 Menzel et al. ........... 102/275.7

FOREIGN PATENT DOCUMENTS

| | | |
|---|---|---|
| EP | 0 905 470 | 3/1999 |
| EP | 0 949 224 | 10/1999 |
| GB | 1 231 181 | 5/1971 |

OTHER PUBLICATIONS

Database WPI, Section Ch, Week 199246, Derwent Publications Ltd., AN 1992–272666, Apr. 1992.
Patent Abstracts of Japan, vol. 008, No. 148 (M–308), JP 59 046419, Mar. 1984.
Database WPI, Section Ch, Week 197547, Derwent Publications Ltd., AN 1975–77729W, May 19975.

* cited by examiner

*Primary Examiner*—Mark Paschall
(74) *Attorney, Agent, or Firm*—Parkhurst & Wendel, L.L.P.

(57) ABSTRACT

The invention relates to a plasma torch (1) comprising at least two electrodes (7, 8) separated by a cylindrical insulating case (6) delimiting an internal volume, said electrodes connected by a conductive ignition fuse (11) placed in the internal volume. This torch is characterized in that the fuse (11) comprises at least one conductive material associated with at least one energetic material or one able to react with the conductive material.

Figure 1:
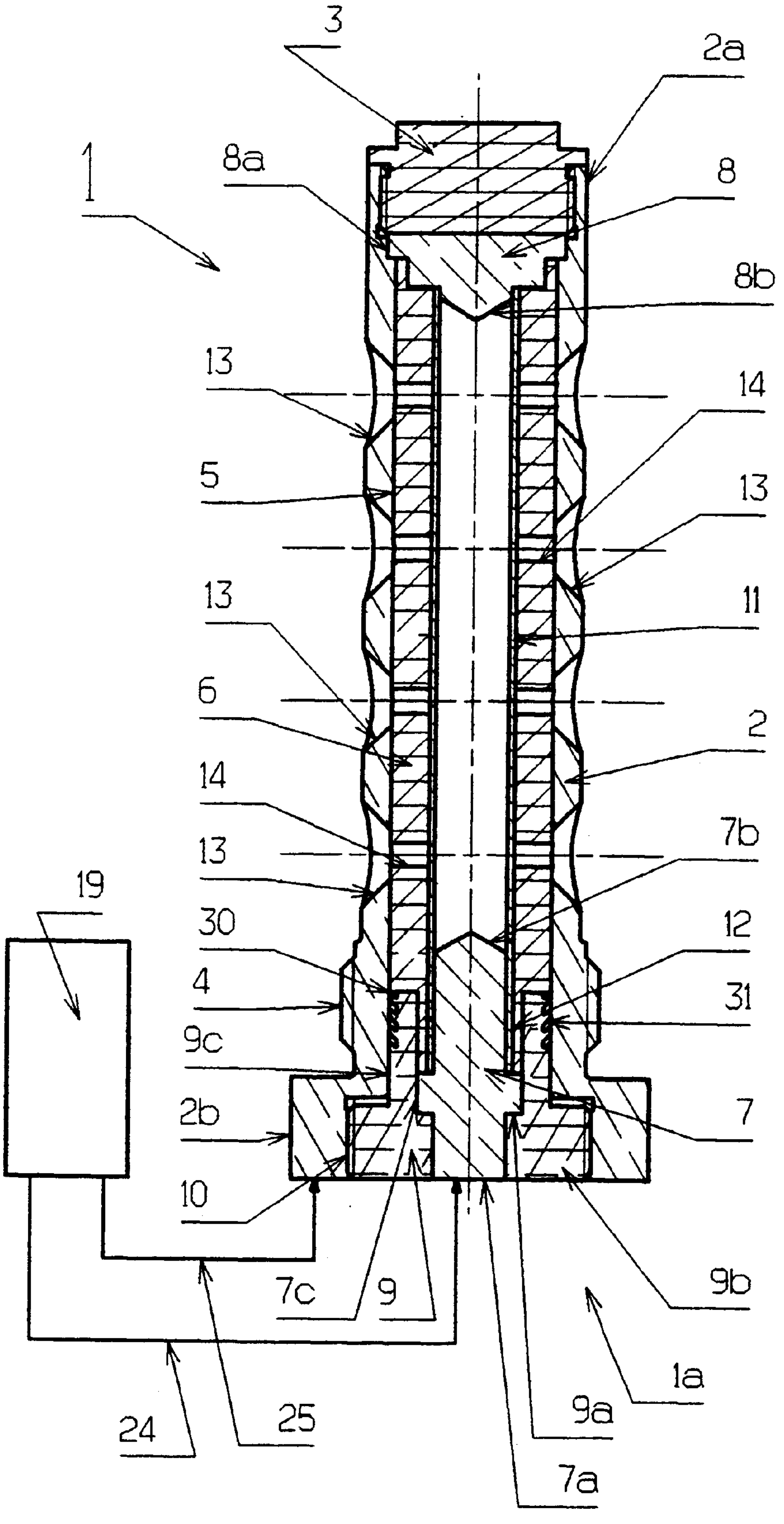

Application to the ignition of the propellant charge of a munition.

24 Claims, 4 Drawing Sheets

PLASMA TORCH INCORPORATING A REACTIVE IGNITION TUBE AND IGNITER SQUIB INTEGRATING SUCH A TORCH

The technical scope of the present invention is that of plasma torches and more particularly torches used to ignite the propellant charge of a piece of ammunition.

A plasma torch is a system that enables high pressure (around 500 MPa) and high temperature (over 10000 K) gases to be generated by a high voltage (around 20 kV) electrical discharge made between two electrodes.

Plasma torches are used in industry, for example, to cut conductive materials, or else to destroy certain products or materials, or to carry out metallic deposits. They are also used in the field of armaments to generate pressure allowing a projectile to be fired.

Known plasma torches comprise an anode and a cathode separated by a capillary tube made of a material that is both electrically insulating and able to decompose in order to generate a plasma (for example a plastic material). The electrical discharge between anode and cathode is excited by means of a copper fuse or other conductive material. The electric arc thus created produces a plasma, which ablates the capillary tube wall, thereby causing the generation of light high pressure high temperature gases.

These gases are used either to directly accelerate a projectile, or to vaporise a working fluid (for example, water) allowing the volume of the gas to be increased.

Patents FR2754969 and FR2768810, which describe plasma torches used to ignite the propellant charge of a piece of ammunition, may be consulted.

One drawback to known plasma torches lies in the fragility of the fuse wire allowing the plasma to be excited. Such a fuse wire has a diameter of 0.1 to 0.5 mm. It may break further to thermal and mechanical stresses (vibration, impacts) that occur during the storage and implementation phases of the ammunition elements.

Moreover, the manufacture of known torches is made difficult and costly by the operation to mount such a fuse.

A plasma torch is also known by U.S. Pat. No. 5,503,081 that incorporates a fuse made in the shape of a tube of porous aluminium. It may also enclose an energetic fluid that is dispersed with the plasma through the propellant charge.

This fuse takes up a lot of space and requires a certain energy level to vaporise and ignite a plasma arc. This results in difficulties in integrating such a torch in a combat vehicle where electrical energy resources are obligatorily reduced. The aim of the invention is to overcome such drawbacks.

Thus, the torch according to the invention has improved mechanical strength thereby improving its reliability. Moreover, it is simple in structure and may be manufactured at a low cost.

Furthermore, the torch according to the invention incorporates a fuse of reduced mass requiring a reduced level of energy to be vaporised. According to the invention, this fuse associates at least one conductive material and at least one energetic or reactive material, that is to say one able to react with the conductive material.

These materials are associated:

- either in the form of a homogeneous mixture of pulverulent materials, agglomerated with the possible addition of a binder,
- or in the form of the close contact of at least one layer of conductive material with at least one layer of energetic or reactive material.

These two embodiments of the invention share the common characteristic of closely associating a relatively reduced mass of conductive material that is vaporised from the onset of the application of the serviceable voltage and causes either the ignition of an energetic material or the chemical reaction of a reactive material with the conductive material.

In any event, the chemical energy released by the reaction thus provoked is produced in the form of a combustion flame that will act as a conductive medium ensuring the passage of the electric arc of the plasma.

In the torch known by U.S. Pat. No. 5,503,081 a porous metallic fuse is firstly vaporised to ensure the ignition of the electric arc then releases a combustible or energetic material that will be spread by the plasma. The vaporisation of this porous metallic fuse as well as the dispersion of the material it encloses will consume energy and therefore reduce the temperature of the plasma generated, thereby reducing the igniting performance.

On the contrary, in the torch according to the invention, the total mass of the fuse implemented is very reduced (around a few hundreds of milligrams). It therefore consumes little energy but is enough to ignite the energetic material or trigger the reaction of a suitable reactive material with the conductive material.

The flame thus produced is a conductive medium that allows the arc between the electrodes and the torch to be maintained using a minimum serviceable voltage (around 1000 volts for an air gap of 10 cm, whereas known torches operate at between 10 KV and 30 KV for an air gap of 10 cm).

Such functioning cannot be obtained, however, using the structure of the porous fuse described by U.S. Pat. No. 5,503,081. Indeed, the porosity of the tube is difficult to control. Consequently, the relative proportions between conductive and reactive materials are fixed by the porosity and may therefore not be adjusted so as to ensure a chemical reaction between these two materials. Moreover, a porous metallic tube such as that described by U.S. Pat. No. 5,503,081 cannot accommodate a solid reactive or energetic material such as a pyrotechnic composition in its pores.

The torch according to the invention can be made without any difficulty at very different lengths.

A further subject of the invention is an igniter squib tube for an ammunition that incorporates such a plasma torch.

Thus, the invention relates to a plasma torch comprising at least two electrodes separated by a cylindrical insulating case delimiting an internal volume, said electrodes connected by a conductive ignition fuse placed in the internal volume, said torch wherein the fuse comprises at least one conductive material associated with at least one energetic material or one able to react with the conductive material.

The conductive material will be constituted by carbon or else a metal.

The energetic material or material able to react with the conductive material may be selected from among the following compounds or compositions:

Copper oxide; polytetrafluoroethylene; chlorofluoroethylene copolymer; polytetrafluoroethylene/chlorofluoroethylene copolymer; Magnesium/polytetrafluoroethylene/chlorofluoroethylene copolymer; Boron/potassium Nitrate; plasticised nitrocellulose coating or film; polyvinyl nitrate; Polyoxymethylene; polychlorotrifluoroethylene; polyvinyl chloride; polychlorotrifluoroethylene; polysulfone; polyvinylidene fluoride.

According to a first embodiment of the invention, the conductive material can be in the form of a powder or of particles mixed with the energetic material or with the material able to react with the conductive material.

The fuse may thus be made of a homogeneous mixture associating 6 to 40% in mass of conductive material powder and 60 to 94% in mass of an energetic material or one able to react with the conductive material.

The fuse can thus be made of a homogeneous mixture associating:

10 to 40% in mass of copper powder, and preferably 20%, 60 to 90% in mass of a composition associating Magnesium, polytetrafluoroethylene and chlorofluoroethylene copolymer, and preferably 80%.

The fuse can also by made of a homogeneous mixture associating:

10 to 40% in mass of silver powder, and preferably 20%, 60 to 90% in mass of a composition associating Magnesium, polytetrafluoroethylene and chlorofluoroethylene copolymer, and preferably 80%.

The fuse can also be made of a homogeneous mixture associating:

10 to 40% in mass of silver powder, and preferably 20%, 60 to 90% in mass of a composition associating Boron and potassium nitrate, and preferably 80%.

According to a second embodiment, the conductive material may form at least one layer deposited over at least part of the energetic material or material able to react with the conductive material.

The fuse may thus comprise at least one conductive layer of aluminium or magnesium deposited on a reactive layer of polytetrafluoroethylene, or nitrocellulose or polyvinyl nitrate, or copper oxide or chlorofluoroethylene copolymer, or polyoxymethylene, or polychlorotrifluoroethylene, or polysulfone, or polyvinylidene fluoride.

The dimensions of the different layers will be selected such that 85 to 95 parts in mass of the conductive layer material will be associated with 5 to 15 parts in mass of the material or material of the reactive layer or layers.

The fuse may comprise at least one layer of aluminium and at least one layer of chlorofluoroethylene copolymer.

Advantageously, the fuse may also comprise at least one layer of flame intensifying material.

The flame intensifying material may be polyoxymethylene or nitrocellulose.

The mass of the flame intensifying material may represent between 15 and 25 parts in mass added to the other materials of the fuse.

The fuse may advantageously be in the shape of a tube placed in the internal volume.

The tube may have at least one longitudinal slit.

The cylindrical insulating case may be placed in a tubular conductive body electrically connected to an electrode, the tubular conductive body being coated on at least part of its surface by an insulating material.

According to a variant embodiment, the tubular body may be perforated by at least two radial vents placed opposite radial holes made in the insulating case, vents and holes being obturated by the tubular fuse.

According to another variant embodiment, the front electrode may be perforated by an axial hole.

A further subject of the invention is an igniter squib tube for an ammunition comprising at least such a plasma torch.

Figure 2:
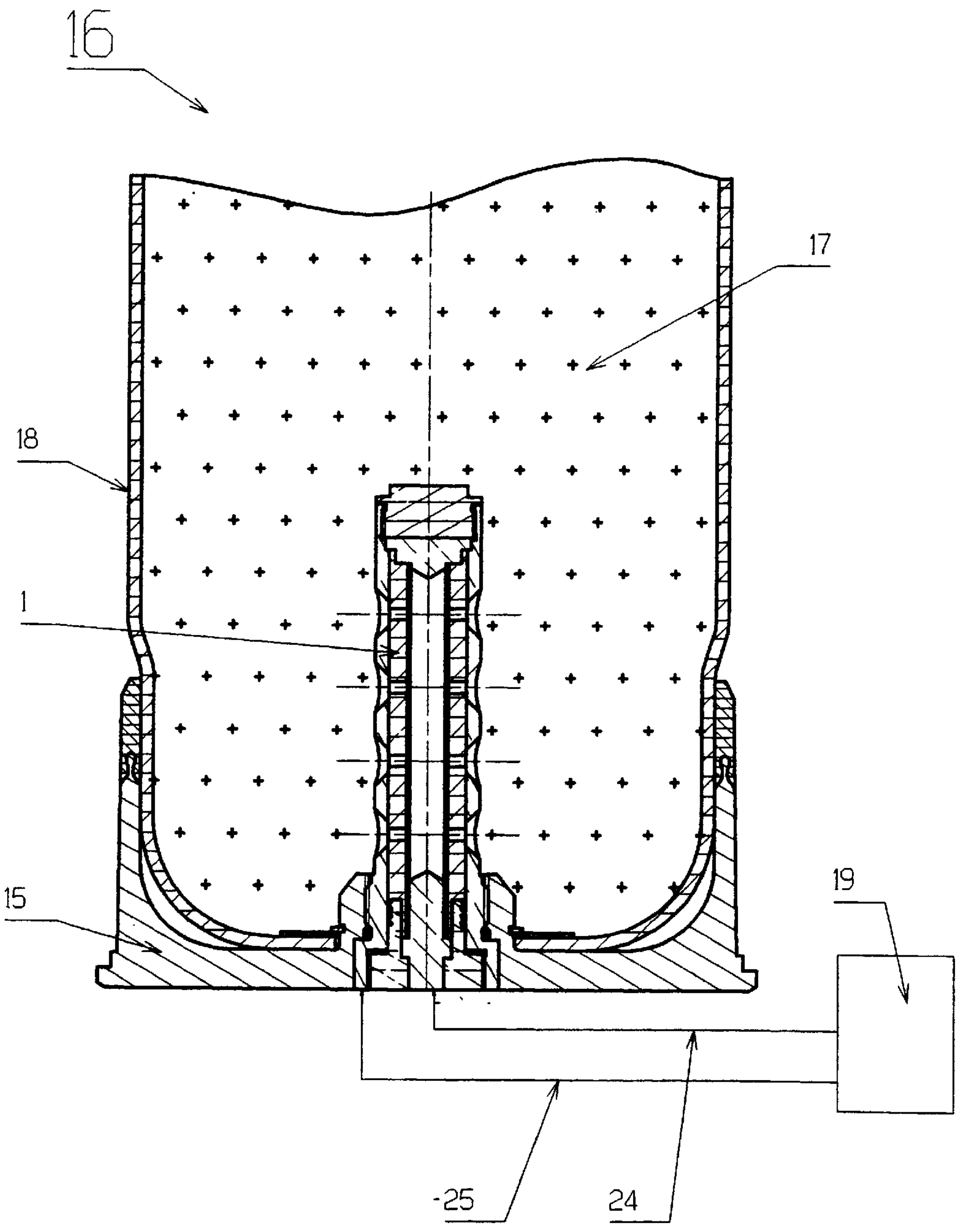
Figure 3:
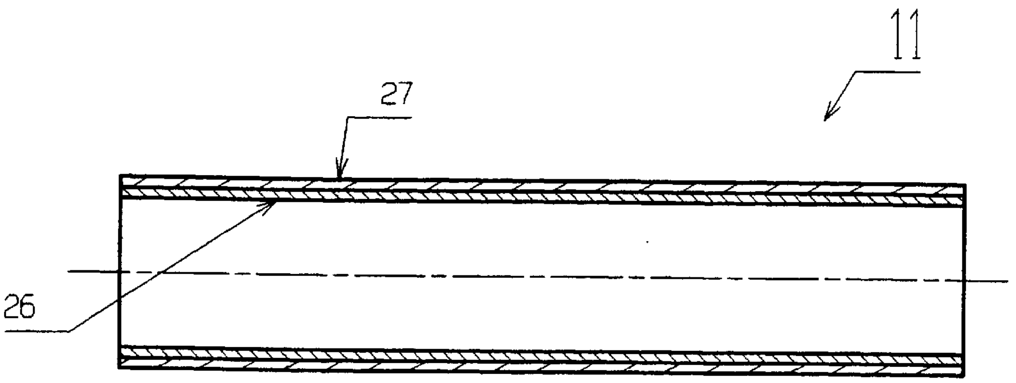
Figure 4:
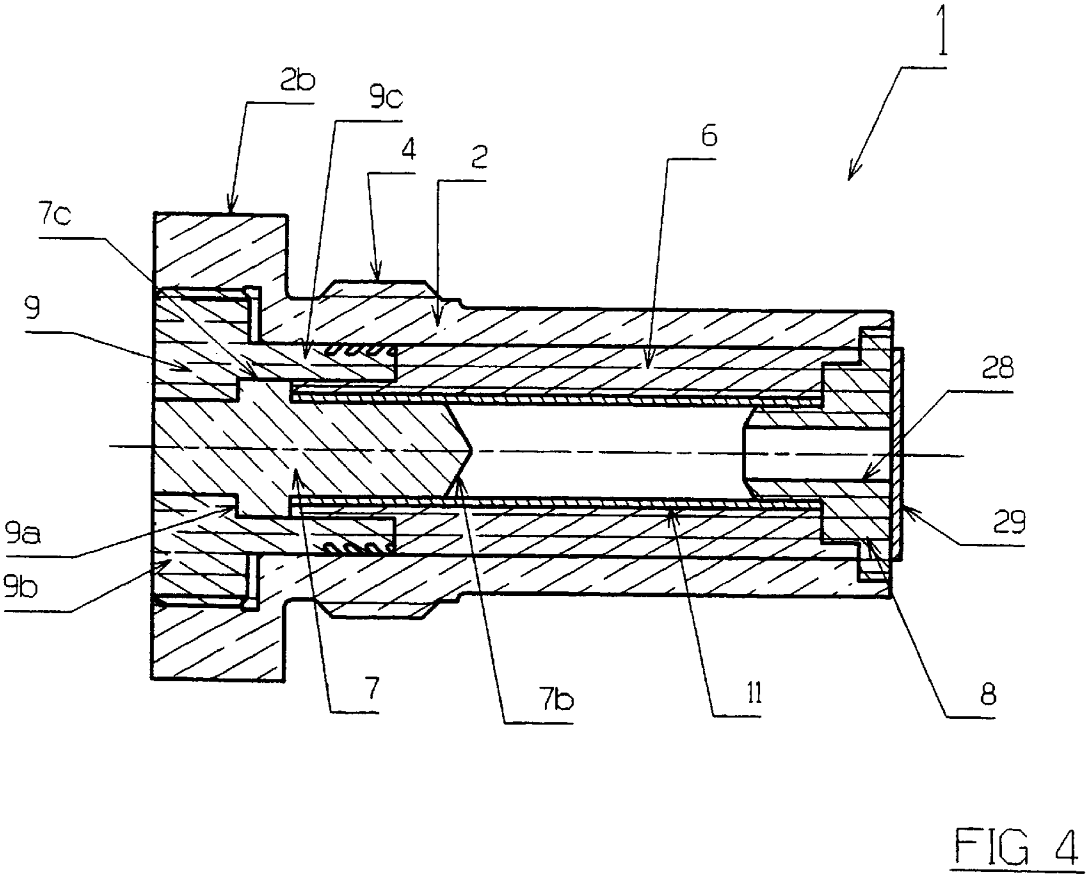
Figure 5:
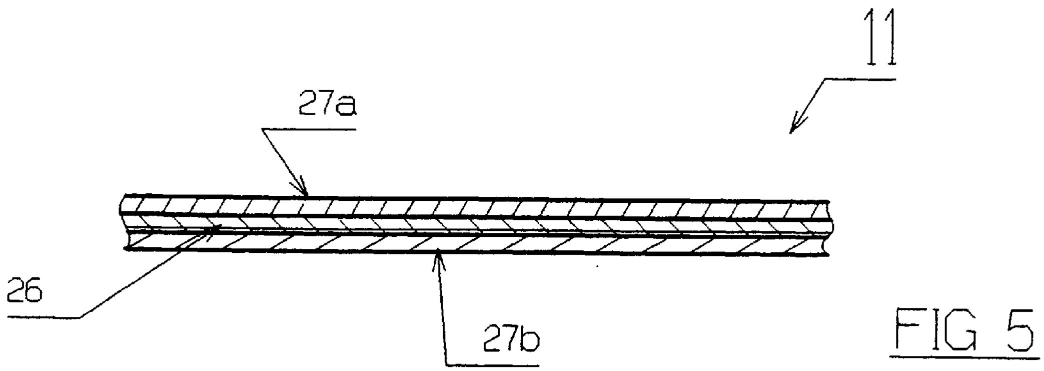
Figure 6:
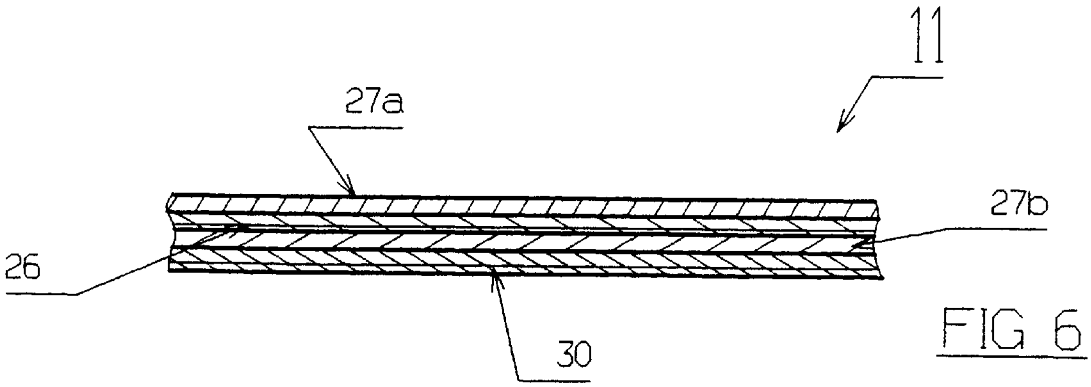
Figure 7:
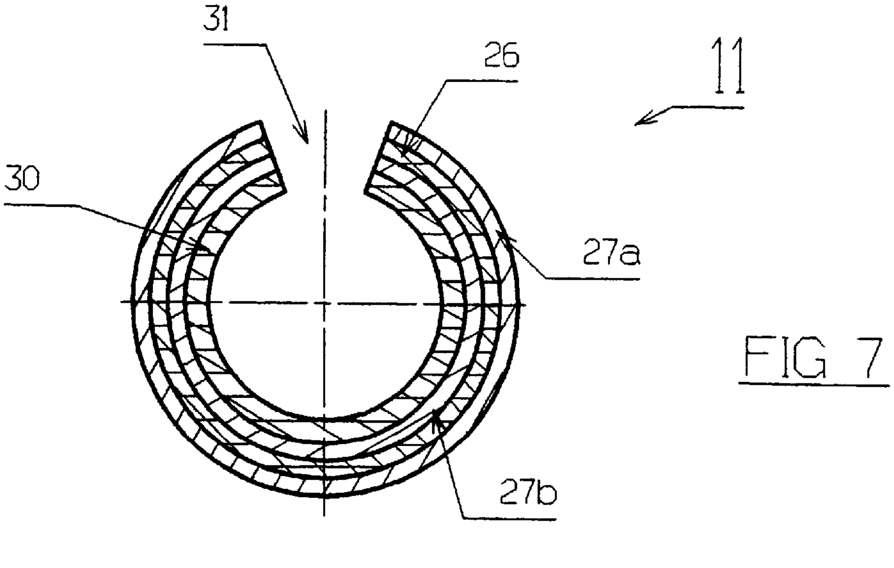

Other advantages of the invention will become apparent after reading the following description of the different embodiments, such description being made in reference to the appended drawings in which:

FIG. 1 shows a longitudinal section of a first embodiment of a torch according to the invention, FIG. 2 shows a torch according to the invention adapted onto an ammunition, FIG. 3 shows a longitudinal section of a fuse implemented in a second embodiment of the invention, FIG. 4 shows a torch according to a third embodiment of the invention, FIG. 5 shows a partial section of a variant embodiment of a fuse according to the invention, FIG. 6 shows a partial section of another variant embodiment of a fuse according to the invention, FIG. 7 shows a cross section of another variant embodiment of a fuse according to the invention.

With reference to FIG. 1, a plasma torch 1 according to a first embodiment of the invention comprises a metallic tubular body 2, sealed at a front part 2*a* by a lid 3 made of a plastic material. The lid 3 is attached to the body 2, for example by threading.

The rear part 2*b* of the body 2 has en-enlarged diameter so as to constitute an abutted shoulder making it easier to attach the torch in a bore of a support (not shown), for example an ammunition base. Also to enable this attachment of the torch 1, the body 2 has threading 4.

The body 2 has an axial bore 5 inside which is placed an insulating cylindrical case 6 made of a plastic material able to ablate, that is to say to generate light gases through the action of a plasma. The case 6 may, for example, be made of polyethylene, polyoxymethylene or polytetrafluoroethylene. The case 6 may also be made of an energetic material, for example nitrocellulose.

Such a case is generally called a capillary tube in known plasma torches.

Two metallic electrodes 7 and 8 are separated by the insulating case 6. The electrodes are made, for example, of a copper alloy.

A globally cylindrical rear electrode 7 having the same axis as the body 2 extends inside the case 6. It has a read end 7*a* that is flush with the rear face 1*a* of the torch. Its front-end 7*b* is pointed so as to obtain a field effect thereby allowing the capture of the foot of the electric arc that will generate the plasma.

A front electrode 8 is applied against the case 6 by the lid 3. It has a peripheral shoulder 8*a* that is tightly fitted to the body 2. It also has a pointed central nipple 8*b* that helps the arc to be captured and which extends inside the case 6.

The rear electrode 7 also has a shoulder 7*c* that here acts as a positioning abutment for the rear electrode 7 with respect to the body 2. The shoulder 7*c* presses against a countersink 9*a* of a support 9 made of an insulating material having high mechanical strength, for example a phenolic plastic or polyoxymethylene. The support 9 incorporates a flared rear part 9*b* that is attached to the body 2 by threading 10. The support 9 comprises a tubular front part 9*c* that is fitted into the bore 5 in the body 2. This front part incorporates ring-shaped sealing lips 30 separated by ring-shaped grooves 31. Through their radial deformation during its operation, the lips 30 ensure sealing for the gases produced by the torch 1. The grooves 31 form expansion chambers also improving gas-tightness.

According to the invention, a tube 11 is placed in the inner volume delimited by the insulating case 6.

This tube caps the cylindrical ends 7*b* and 8*b* of electrodes 7 and 8. At the rear electrode 7, the tube 11 is pinched between the external cylindrical surface of the electrode 7 and a thinned end 12 of the insulating case 6, itself in contact with the front part 9*c* of the support 9.

The tube 11 constitutes an ignition fuse for the plasma torch 1. To this end, the tube 11 comprises at least one conductive material associated with at least one energetic material or material able to react with the conductive material.

The term energetic material refers to a material able to supply chemical energy in the form of a flame when ignited by the Joule effect generated by the passage of the current through the conductive material to which it is closely linked.

The term reactive material or material able to react with the conductive material refers to a material, inert in isolation, but able to react chemically with the conductive material when the latter is heated through the Joule effect. Chemical energy is therefore supplied by this reaction in the form of a flame.

The conductive material may be constituted by carbon or else by a metal such as copper, aluminium, silver or magnesium.

The energetic material or the material able to react with the conductive material may be selected from among the following compounds or compositions:

Copper oxide; polytetrafluoroethylene; chlorofluoroethylene copolymer; polytetrafluoroethylene/chlorofluoroethylene copolymer; Magnesium/polytetrafluoroethylene/chlorofluoroethylene copolymer; Boron/potassium Nitrate; plasticised nitrocellulose coating or film; polyvinyl nitrate; polyoxymethylene; polychlorotrifluoroethylene; polyvinyl chloride; polychlorotrifluoroethylene; polysulfone; polyvinylidene fluoride.

In this list the energetic compositions are the following compositions: Magnesium/polytetrafluoroethylene/chlorofluoroethylene copolymer; Boron/potassium Nitrate; plasticised nitrocellulose coating or film; polyvinyl nitrate.

In this list the materials that react with the conductive material are: Copper oxide; polytetrafluoroethylene; chlorofluoroethylene copolymer; polytetrafluoroethylene/chlorofluoroethylene copolymer; Polyoxymethylene; polychlorotrifluoroethylene; polyvinyl chloride; polysulfone; polyvinylidene fluoride.

According to the particular embodiment shown in FIG. 1, the fuse tube is formed by a homogeneous mixture associating 6 to 20% in mass of powder or particles of conductive material and 80 to 94% in mass of an energetic material or one able to react with the conductive material.

A fuse tube may be manufactured, for example, using the following compositions:

EXAMPLE 1

10 to 40% in mass of copper powder, and preferably 20%, 60 to 90% in mass of a composition associating Magnesium, polytetrafluorethylene and chlorofluoroethylene copolymer, and preferably 80%.

EXAMPLE 2

10 to 40% in mass of silver powder, and preferably 20%, 60 to 90% in mass of a composition associating Magnesium, polytetrafluorethylene and chlorofluoroethylene copolymer, and preferably 80%.

EXAMPLE 3

10 to 40% in mass of silver powder, and preferably 20%, 60 to 90% in mass of a composition associating Boron and potassium nitrate, and preferably 80%.

The Boron/potassium nitrate composition will associate 80% in mass of Boron for 20% in mass of potassium nitrate.

The tube is firstly made by mixing the different grained materials followed by isostatic pressing in a suitably shaped mould. A nitrocellulose-based binder may be provided to ensure the mechanical strength of the tube.

Patent FR2776656 describes, for example, a production process that could be implemented to manufacture such a tube.

The tube 11 is around 0.5 mm thick; its resistance is around a few hundreds of milli ohms.

According to the embodiment shown in FIG. 1, the metallic body 2 has radial conical vents 13 flared towards the outside of the body 2 to facilitate evacuation of the gases.

These vents are evenly spaced angularly and longitudinally (here only eight vents out of a total of sixteen have been represented).

The vents 13 are placed opposite radial cylindrical holes 14 made in the insulating case 6.

Vents 13 and holes 14 are intended to facilitate the radial diffusion of the plasma generated by the torch 1, for example to ensure the ignition of the propellant charge of a munition (not shown).

The diameter of the holes 14 is less than the smallest diameter of the vents 13 and this in order to facilitate the ablation of the capillary case 6.

The holes 14 and the vents 13 are obturated by the tubular fuse 11.

To improve the electrical insulation of the torch, the conductive tubular body 2 will be coated over substantially all its external and internal surfaces by an insulating material (not shown), for example the deposit under vacuum of 30 to 80 micrometers of a plastic material such as diparazylylene. The deposit of plastic material will only be avoided at the cylindrical seat ensuring the passage of the current from the tube 2 to the electrode 8 and at the zone of back current towards the generator 19 (for example at the rear face 2*b*).

This torch is assembled by simply stacking the different elements inside the body 2. For example, we may start by attaching the rear support 9 carrying the rear electrode 7 onto the body 2. The case 6, inside which the fuse tube 11 is placed, is then slid by the front of the body 2 into position. Pushing the case 6 into the body ensures the tube 11 is pinched around the rear electrode 7 and consequently ensures good electrical contact here.

The case will be suitably angled to as to position the holes 14 opposite the vents 13. Such positioning may be made easier by providing a peripheral indentation on the case 6 located in the vicinity of the front electrode 8 and co-operating with a notch arranged in the body (details not shown).

The front electrode 8 is then pushed home and is tightly fitted both in the tube 11 and in the body 2 to optimise the electrical contact, and then the torch is closed by screwing on its lid 3.

As we can see, such an assembly is very easy to carry out. The fuse tube 11 fits easily into place. No welding is required; there is no risk of breaking a fuse wire. The contact resistances between the electrodes 7, 8 and the fuse tube are reduced because of the large contact surfaces. The resulting assembly is robust. The case supports the fuse tube over substantially all its cylindrical surface.

In accordance with FIG. 2, a torch 1 according to the invention is, for example, attached to a base 15 of an ammunition 16 (partly shown). The ammunition 16 classically incorporates a propellant charge of powder 17 placed in a combustible case 18. A projectile (not shown) is fastened to the combustible case 18 at its front part.

The ammunition 16 is placed in the chamber of a weapon (not shown). The weapon incorporates an electrical generator 19 connected by electrical connections 24 and 25 to the torch 1. A first connection 24 is in electrical contact by suitable means (for example a spring touch needle, not shown) with the rear electrode 7. A second connection 25 is in electrical contact with the metallic body 2 of the torch, for example by a spring touch needle pressing on its rear part 2*b* or on the metallic base 15 itself.

The body 2 is in electrical contact with the front electrode 8 thanks to the tight fit of the shoulder 8*a* of the electrode in the bore 5 of the body 2.

Furthermore, the fuse tube 11 is in electrical contact with the two electrodes 7 and 8 thanks to the tight fit of the tube 11 between the case 6 and the cylindrical parts 7*b* and 8*b* of the electrodes (see FIG. 1).

This torch operates as follows.

The generator 19 is designed to be able to deliver a power of 10 KJ at 1 mega Joule in the form of pulses at a voltage of 1000 volts to 20 kilo Volts. Such a generator is classical and comprises, for example, capacitances, one inductance, thyristors and a stabilised power supply.

A small fraction of the power supplied by the generator is used to ignite the fuse tube 11 by joule effect. The energetic material is then ignited or else the reaction between the conductive material and the reactive material is initiated. A combustion flame is established over substantially the full length of the tube 11, releasing the holes 14 and vents 13.

This flame is formed naturally of ionised atoms and molecules. It ensures an electrical conduction of reduced resistance between the electrodes 7 and 8 allowing the arc to be maintained between said electrodes 7 and 8.

Classically, the confinement of the electrical arc in the ablatable-material based case 6 enables a plasma to be generated that flows out of the body through the vents 13.

The plasma ensures the ignition of the propellant charge 17 of the ammunition whilst procuring those advantages normally associated with ignition by electrical plasma: higher level of pressure and temperature than that of classical pyrotechnic ignition due to the addition of electrical energy by the generator. This results in greater velocity for the projectile.

The energetic fuse proposed by the invention also has the advantage of supplying igniting energy itself (in chemical form). It thus allows a generator to be used that supplies a lower voltage than that supplied by generators used in classical plasma torches. In practical terms, a voltage of 1000 volts is sufficient, compared to 10 to 35 kilovolts for known plasma torches. The performance of the torch is thus improved and its integration into a weapon system is made easier.

Note that even if a localised crack were to appear on the fuse tube 11, such a crack could not prevent the fuse tube from igniting. The electrical arcs would be produced between the conductive particles and would be sufficient to initiate the reaction that would progress throughout the tube. The level of reliability of such a torch is thus far higher than that of the fuse wire torch whose operation is impossible in the event of the wire breaking.

FIG. 3 shows a preferred embodiment for the fuse tube 11 that can be installed in a torch such as the one shown in FIG. 1.

This tube 11 differs from the previous one in that the conductive material is not mixed homogeneously with the energetic material or the material able to react with it.

The conductive material, in this case, forms a layer 26 deposited over at least part of the energetic material or the material able to react with the conductive material.

In this particular embodiment, the conductive layer 26 is cylindrical and is deposited inside a tube 27 of energetic material or material able to react with the conductive material. Such an arrangement ensures the electrical contact between the electrodes 7 and 8 and the conductive layer 26. The metallic deposit will be obtained, for example, by spray deposition under vacuum of a metal onto the energetic or reactive material. It may also be obtained by projecting a mixture of adhesive and energetic material or material able to react with the conductive material onto a metallic sheet.

A sheet made of the two layers may advantageously be cut and rolled to form the fuse tube 11.

The tube 11 may also incorporate two conductive layers separated by the energetic layer. Such an arrangement will facilitate the generation of discharge arcs between the two conductive layers.

In practical terms a fuse tube may be made that incorporates at least one layer of aluminium or magnesium deposited on a layer of polytetrafluorethylene or polyvinyl chloride.

The metallic layer (or layers) will be around 100 micrometers in thickness. That of the energetic material will be around 150 micrometers.

At least one layer of aluminium or magnesium may be associated with a layer of nitrocellulose or polyvinyl nitrate.

Copper oxide or chlorofluoroethylene copolymer may be deposited onto a sheet of aluminium or magnesium.

It is also possible for aluminium to be deposited onto a layer of polyoxymethylene.

According to a preferred embodiment (which may be described equally with reference to FIG. 3), at least one layer of chlorofluoroethylene copolymer (known under the Trademark Viton) will be deposited onto a layer of aluminium.

The chlorofluoroethylene copolymer may be deposited on both sides of a conductive layer 26 of aluminium (this last variant being schematised in FIG. 5). The references 27*a* and 27*b* designate the two layers of chlorofluoroethylene copolymer deposited on both sides of the aluminium layer 26.

The thicknesses and lengths of the different sheets will be determined according to the relative proportions required for the components reacting together (aluminium and chlorofluoroethylene copolymer).

85 to 95 parts in mass of conductive layer material will be associated with 5 to 15 parts in mass of the reactive layer material or materials. Stoechiometric proportions of 90 parts in mass of aluminium for 10 parts in mass of chlorofluoroethylene copolymer will preferably be associated.

According to a variant schematised in FIG. 6, a layer of conductive material 26 (for example aluminium) may be associated in the same fuse with one or two layers 27*a*, 27*b* of chlorofluoroethylene copolymer and one layer 30 of a flame intensifying material that may be polyoxymethylene or else nitrocellulose.

The dimensions and masses of the different layers will preferably respect the preceding stoechiometry of 90 parts in mass of aluminium for 10 parts in mass of chlorofluoroethylene copolymer. The mass of polyoxymethylene added will represent between 15 and 25 parts in mass added to the other materials of the fuse. It will preferably be 20 parts in mass.

This last variant enables a plasma temperature of 17000 K to 20000 K to be obtained, which is higher (at equal electrical energy) to the temperature obtained with torches implementing polyethylene (around 6000 K).

FIG. 7 shows a cross section of a variant embodiment of a fuse in the shape of a tube 11 of material such as previously described with reference to FIG. 6. Once again, this fuse associates a layer 26 of conductive material (for example, aluminium) to one or two layers 27*a*, 27*b* of chlorofluoroethylene copolymer and to one layer 30 of a flame intensifying material that may be polyoxymethylene or else nitrocellulose.

This variant differs from the previous one in that after rolling the fuse before its installation into the tubular body 2 (FIG. 1), the fuse does not cover an arc of 360°. A slit 31 remains, which represents an arc of less than 180°. This variant allows the mass of the fuse to be reduced whilst conserving the relative proportions of the conductive and energetic components. This reduction in mass reduces the duration of the Joule effect heating phase of the fuse. The energy consumed is thus also reduced without a corresponding reduction in the temperature of the plasma obtained. The expert will adjust the width of the slit required according to the characteristics required for the weapon system he is designing. The different embodiments shown in FIGS. 3, 5, 6 and 7 operate in an analogous manner to that previously described with reference to FIGS. 1 and 2.

The advantage of these embodiments associating at least two layers (one conductive material and one reactive material) lies in their ease of production.

FIG. 4 shows a torch according to a third embodiment of the invention.

This embodiment differs from that shown in FIG. 1 in that the body 2 has no radial vents and the insulating case 6 has no radial holes.

The front electrode 8 is, in this case, attached by threading to the body 2. It incorporates an axial hole 28 that passes through it and is intended to allow the plasma generated by the torch to pass axially. The fuse tube 11 is placed, as in the previous embodiment, around the electrodes 7 and 8 and is surrounded by the ablatable case 6.

The hole 28 will be advantageously sealed by a closing disk or fail 29 made of metal or of a plastic material and bonded to the electrode 8. This disk is intended to ensure storage sealing. It is broken as soon as the torch is ignited.

This embodiment enables a compact plasma torch to be produced (length L less than or equal to 40 mm) and which has an axial direction of action. Such a torch may be used in reduced calibre munitions (less than 50 mm) or else in civil applications (material cutting, safety openings, reduced thickness material deposits, manufacture of metals in nanometric powder . . . ).

It is naturally possible to use a fuse tube 11 for this torch made of a homogenous material such as that described with reference to FIG. 1 or else a multi-layer fuse tube such as that described with reference to FIGS. 3, 5, 6 and 7.

What is claimed is:

1. A plasma torch comprising:

a cylindrical insulating case defining an internal volume;

an electrically conductive ignition fuse located in the internal volume;

at least two electrodes separated by the cylindrical insulating case, said electrodes connected by the conductive ignition fuse, wherein the fuse comprises at least one conductive material mixed with a second material selected from the group consisting of at least one energetic material and at least one reactive material for reacting with the conductive material.

2. The plasma torch according to claim 1, wherein the conductive material is selected from the group consisting of carbon and a metal.

3. The plasma torch according to claim 1, wherein at least one of the energetic material and the reactive material is selected from the group of compounds or compositions consisting of:

copper oxide; polytetrafluorethylene; chlorofluoroethylene copolymer; polytetrafluorethylene/chlorofluoroethylene copolymer; magnesium/polytetrafluorethylene/chlorofluoroethylene copolymer; boron/potassium nitrate; plasticised nitrocellulose coating or film; polyvinyl nitrate; polyoxymethylene; polychlorotrifluoroethylene; polyvinyl chloride; polychlorotrifluoroethylene; polysulfone; polyvinylidene fluoride.

4. The plasma torch according to claim 1, wherein the conductive material comprises a powder mixed with the energetic material or the reactive material.

5. The plasma torch according to claim 4, wherein the fuse comprises a homogeneous mixture of 6 to 40% by mass of conductive material powder and 60 to 94% by mass of said energetic material or said reactive material.

6. The plasma torch according to claim 5, wherein the fuse is a homogeneous mixture comprising:

10 to 40% by mass of copper powder, ,and 60 to 90% by mass of a composition of magnesium, polytetrafluorethylene and chlorofluoroethylene copolymer.

7. The plasma torch according to claim 5, wherein the fuse is a homogeneous mixture comprising:

10 to 40% by mass of silver powder, , and 60 to 90% by mass of a composition comprising magnesium, polytetrafluorethylene and chlorofluoroethylene copolymer.

8. The plasma torch according to claim 5, wherein the fuse is a homogeneous mixture comprising:

10 to 40% by mass of silver powder, 60 to 90% by mass of a composition comprising boron and potassium nitrate.

9. The plasma torch according to claim 1, wherein the conductive material is at least one layer deposited over at least part of the energetic material or reactive material.

10. The plasma torch according to claim 9, wherein the fuse comprises at least one conductive layer of aluminium or magnesium deposited on a reactive layer of polytetrafluorethylene, or nitrocellulose or polyvinyl nitrate, or copper oxide or chlorofluoroethylene copolymer, or polyoxymethylene, or polychlorotrifluoroethylene, or polysulfone, or polyvinylidene fluoride.

11. The plasma torch according to claim 10, wherein the dimensions of the different layers are selected such that 85 to 95 parts by mass of the conductive layer material are mixed with 5 to 15 parts by mass of the material or materials of the reactive layer or layers.

12. The plasma torch according to claim 11, wherein the fuse comprises at least one layer of aluminium and at least one layer of chlorofluoroethylene copolymer.

13. The plasma torch according to claim 11, wherein the fuse comprises at least one layer of flame intensifying material.

14. The plasma torch according to claim 13, wherein the flame intensifying material is polyoxymethylene or nitrocellulose.

15. The plasma torch according to claim 14, wherein the flame intensifying material represents between 15 and 25 parts by mass added to other materials of the fuse.

16. The plasma torch according to claim 1, wherein the fuse is tube shaped and located in the internal volume.

17. The plasma torch according to claim 16, wherein the tube has at least one longitudinal slit.

18. The plasma torch according to claim 1, further comprising a tubular conductive body electrically connected to one off said electrodes, the tubular conductive body being coated on at least part of its surface with an insulating material, wherein the cylindrical insulating case is located in a tubular conductive body.

19. The plasma torch according to claim 18, wherein the tubular body at least two radial vents located opposite radial holes in the insulating case, said vents and holes being through-holes obturated by the tubular fuse.

20. The plasma torch according to claim 18, wherein the front electrode has an axial through-hole.

21. The plasma torch according to claim 1, in combination with an igniter squib tube for ammunition.

22. The plasma torch according to claim 5, wherein the fuse is a homogeneous mixture comprising:

20% by mass of copper powder and 80% by mass of a composition comprising magnesium, polytetrafluorethylene and chlorofluoroethylene copolymer.

23. The plasma torch according to claim 5, wherein the fuse is a homogeneous mixture comprising:

20% by mass of silver powder and 80% by mass of a composition comprising magnesium, polytetrafluorethylene and chlorofluoroethylene copolymer.

24. The plasma torch according to claim 5, wherein the fuse is a homogeneous mixture comprising:

20% by mass of silver powder and 80% by mass of a composition comprising boron and potassium nitrate.

* * * * *